United States Patent [19]

Hudgins

[11] 4,376,603

[45] Mar. 15, 1983

[54] DEBURRING MACHINES FOR SHOP AND SCREW MACHINE PARTS

[75] Inventor: Herbert E. Hudgins, Gastonia, N.C.

[73] Assignee: A. B. Carter, Inc., Gastonia, N.C.

[21] Appl. No.: 189,631

[22] Filed: Sep. 22, 1980

[51] Int. Cl.³ .................. B23C 3/12; B23D 47/04; B24B 7/16
[52] U.S. Cl. .................................. 409/140; 51/102; 51/128; 83/914; 409/226; 409/258
[58] Field of Search .............. 409/140, 139, 138, 226, 409/258, 132; 408/224, 1; 83/912, 914; 144/323; 51/102, 128; 30/392

[56] References Cited

U.S. PATENT DOCUMENTS

| | | |
|---|---|---|
| 1,489,532 | 4/1924 | Kardong ......................... 409/226 |
| 2,056,053 | 9/1936 | Moore ............................ 408/1 X |
| 2,096,320 | 10/1937 | Coleman ...................... 409/226 X |
| 3,738,003 | 6/1973 | Dietzn et al. .................... 30/392 |
| 3,797,350 | 3/1974 | Orrick et al. .................. 83/912 X |
| 3,998,254 | 12/1976 | Morin ........................ 408/224 X |

Primary Examiner—Z. R. Bilinsky
Attorney, Agent, or Firm—Robert Brown, Jr.

[57] ABSTRACT

Apparatus for removing shop or screw machine part or workpiece. More specifically, the apparatus comprises a bushing with a hole therein for axially guiding the burred end of the part into engagement with a disintegrating mechanism such as a saw, grinder or abrader, in combination with a stop for arresting both the inward movement of the part and the resulting disintegration when the burr becomes disintegrated flush with said flat end.

5 Claims, 12 Drawing Figures

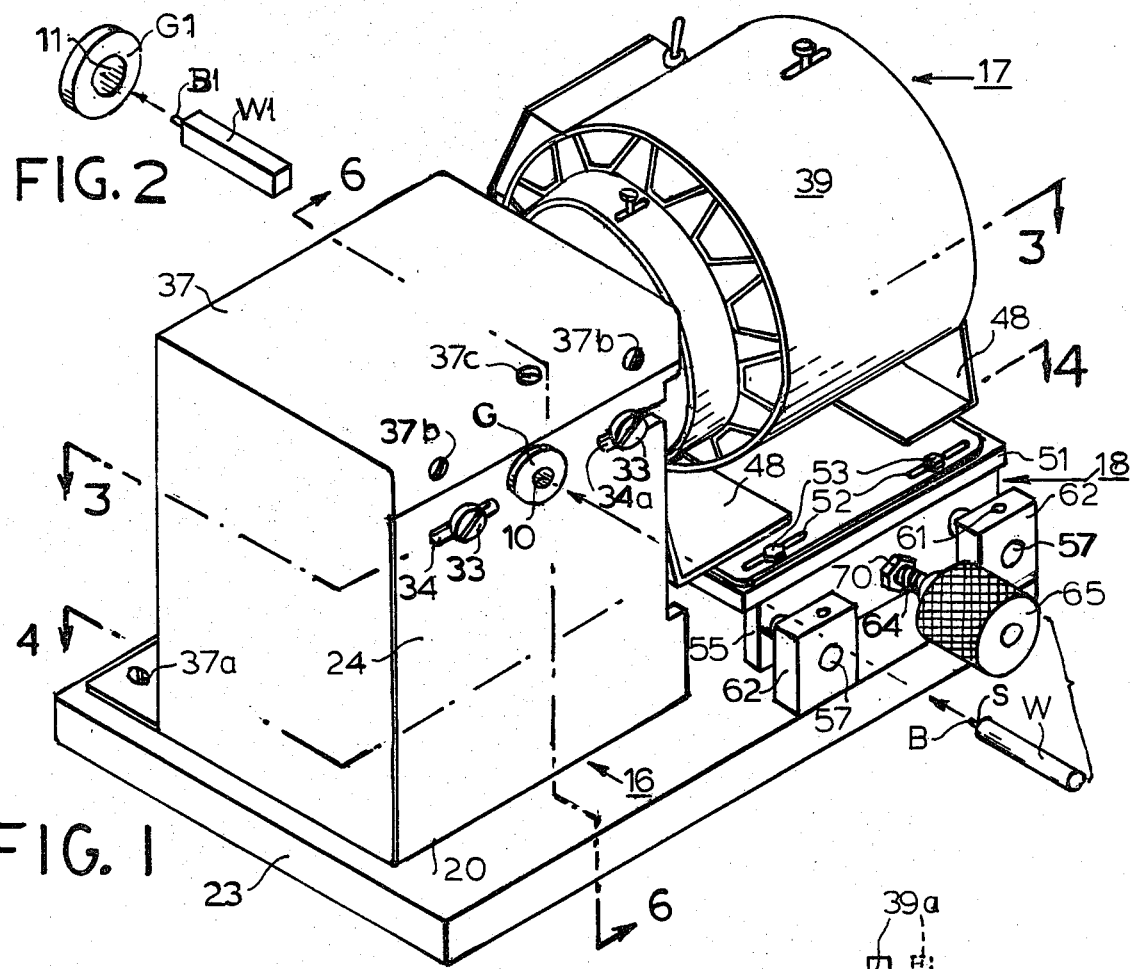
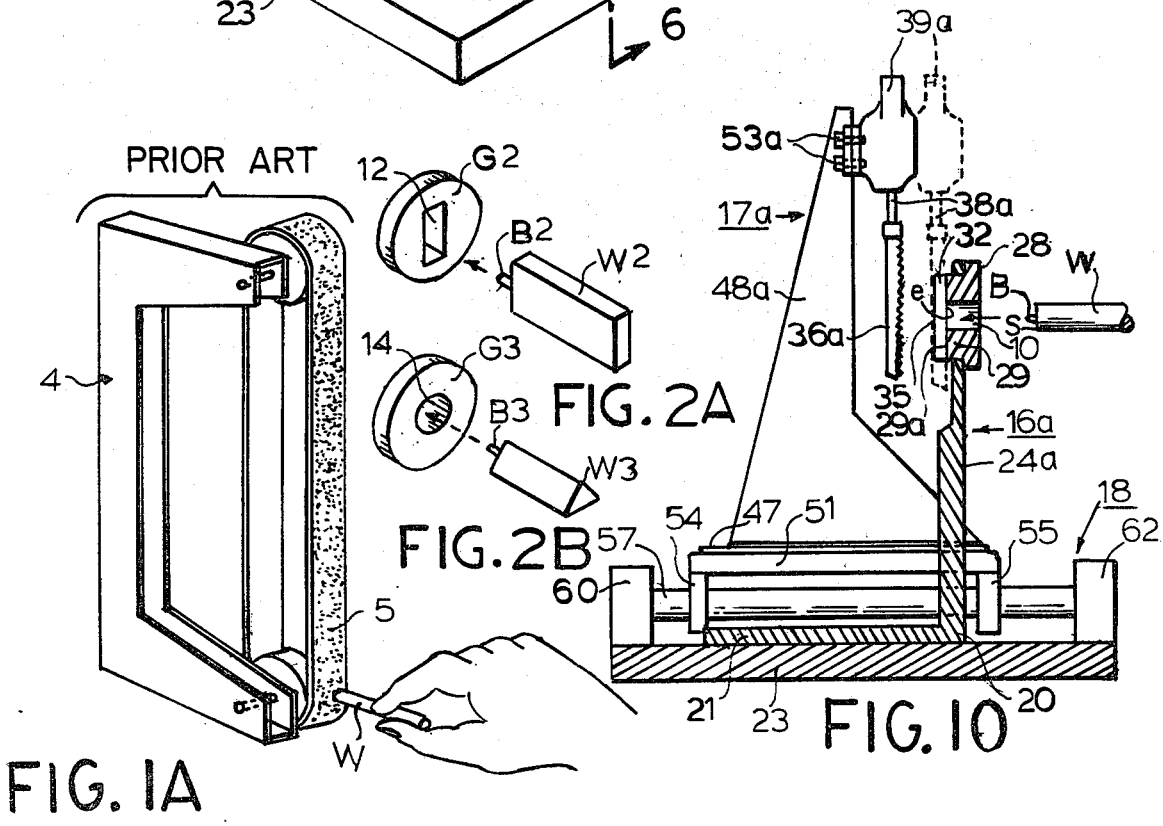

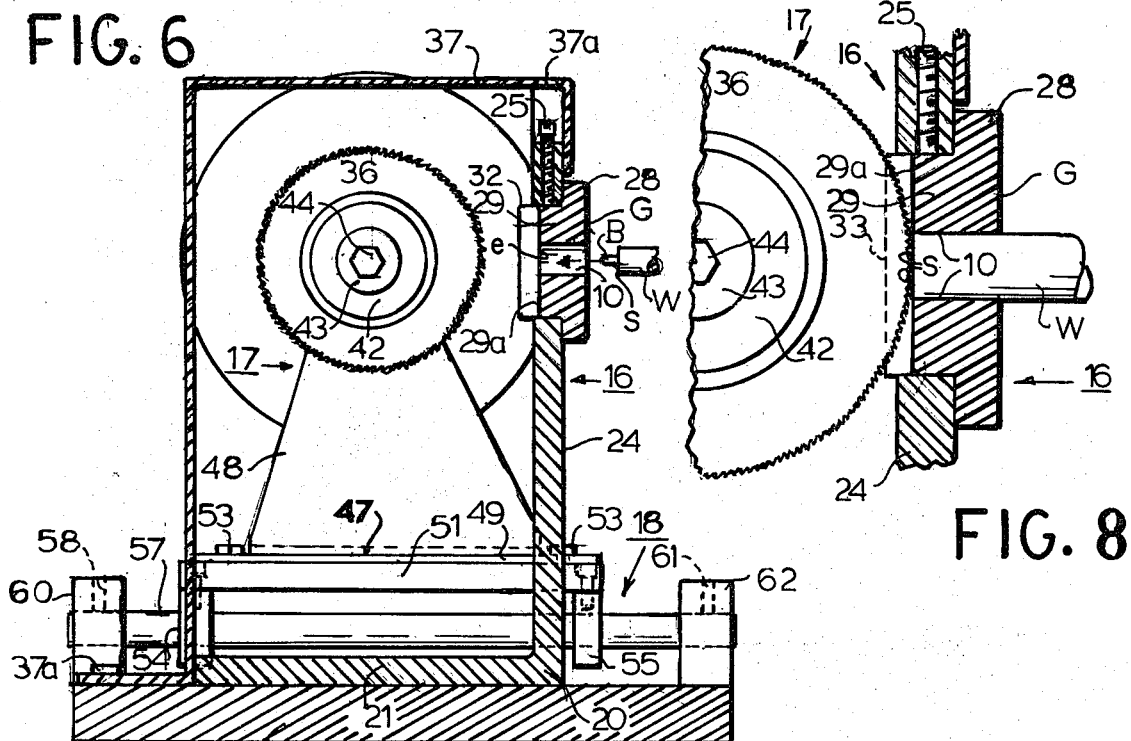
FIG. 6
FIG. 8
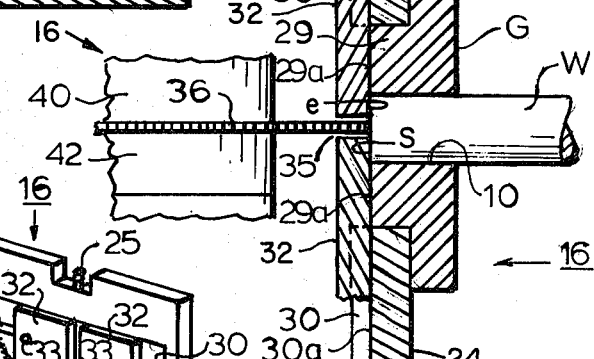
FIG. 7
FIG. 9
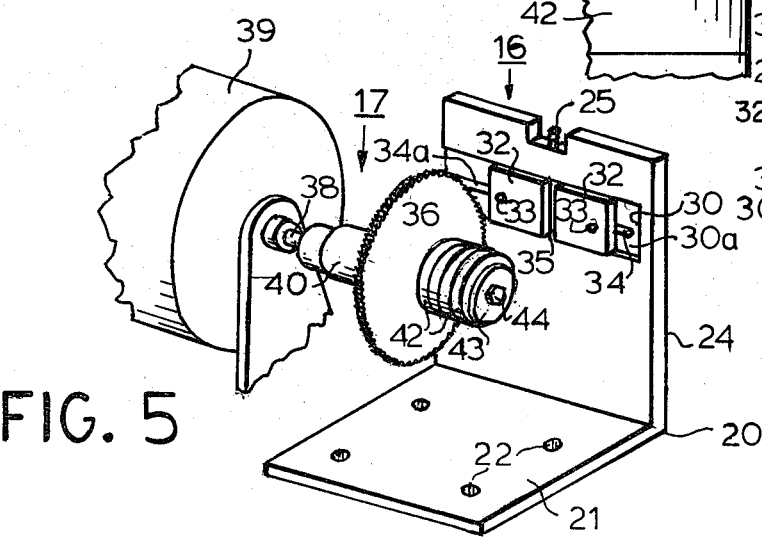
FIG. 5

DEBURRING MACHINES FOR SHOP AND SCREW MACHINE PARTS

This invention relates to metal working and more especially to a machine for removing burrs from shop and screw machine parts which have been severed to exact lengths, except for the burrs, from a longer length of bar stock by the cutting tools of turning lathes or like machines.

Specifications often require such parts to be finished exactly to specified lengths, and without the burr projecting from either end of each part. When the cutting tool of a turning lathe is employed to initially sever the parts from bar stock, it leaves a short burr projecting axially from one of the proximate flat ends of each cut. This burr must be removed subsequently so that the entire end of each piece will be finished in accordance with specifications.

Heretofore, conventional belt sanders 4 have been employed to remove the burred ends B from the parts or workpieces W in the manner illustrated in FIG. 1A of the drawings. The operator manually presses the burred end B of the part W against travelling belt 5 which, in turn, disintegrates the burr until the operator believes it has been properly removed. If upon removal of the workpiece from engagement with the belt he should find additional sanding to be necessary, the step is repeated. If upon removal of the ground part from the belt, the end is found to be ground too much, or unevenly as a result of holding it at the improper angle, the part must be discarded. Moreover, injury to the operator's fingers frequently occurs due to contact with moving sanded parts.

It is therefore an object of this invention to provide a deburring machine which will obviate the above-discussed drawbacks accompanying the use of certain conventional deburring methods and apparatus.

It is a further object of this invention to provide a deburring machine comprising a guide for directing a machine part or workpiece longitudinally into engagement with a disintegrating mechanism such as a saw, grinder or abrader, in combination with a stopping means for arresting said inward movement and the concurrent disintegration precisely at the moment that the burr becomes disintegrated completely.

Some of the objects of invention having been stated, other objects will appear as the description proceeds when taken in connection with the accompanying drawings in which, FIG. 1 is an isometric view of a deburring machine according to the invention, showing a cylindrical machine part or workpiece W positioned for insertion into guide bore 10 of the machine;

FIG. 1A is an isometric view of a conventional deburring apparatus;

FIGS. 2, 2A and 2B are schematic views of other shapes or workpieces which may be deburred by the present machine, using modified bushing guides to accommodate the respective shapes;

Figure 4:
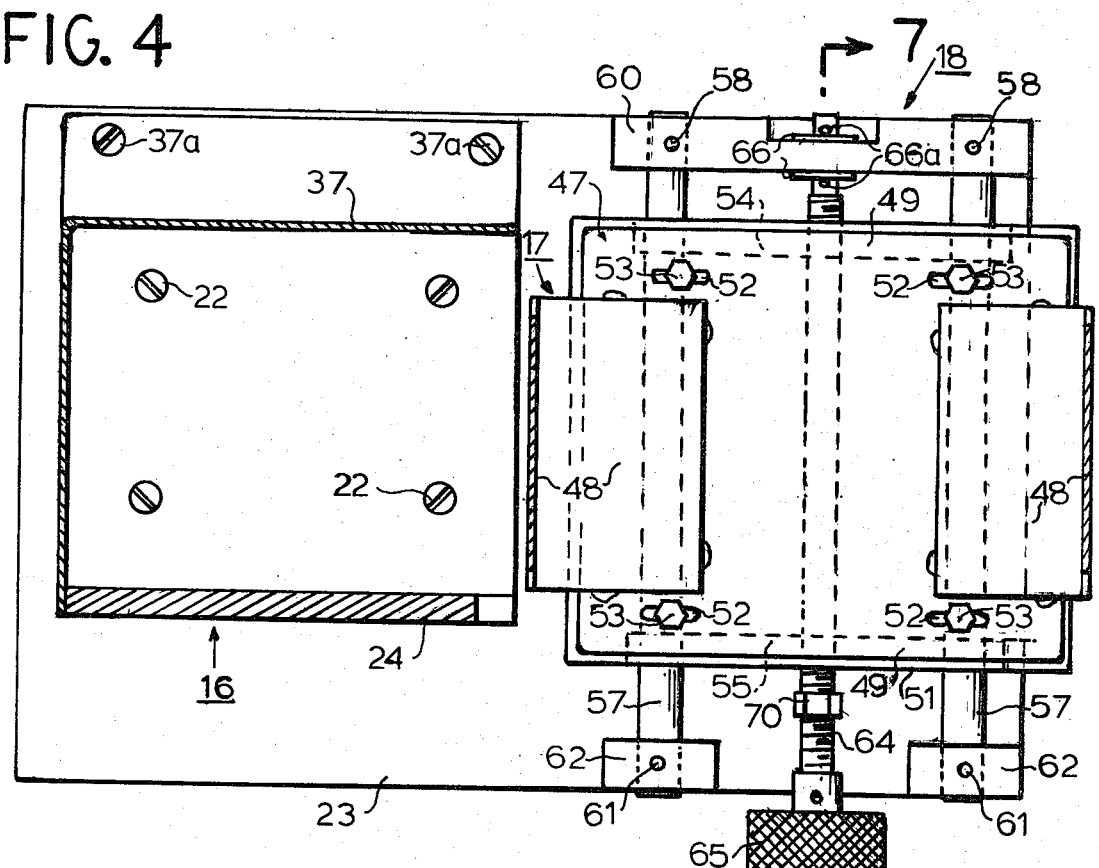
Figure 3:
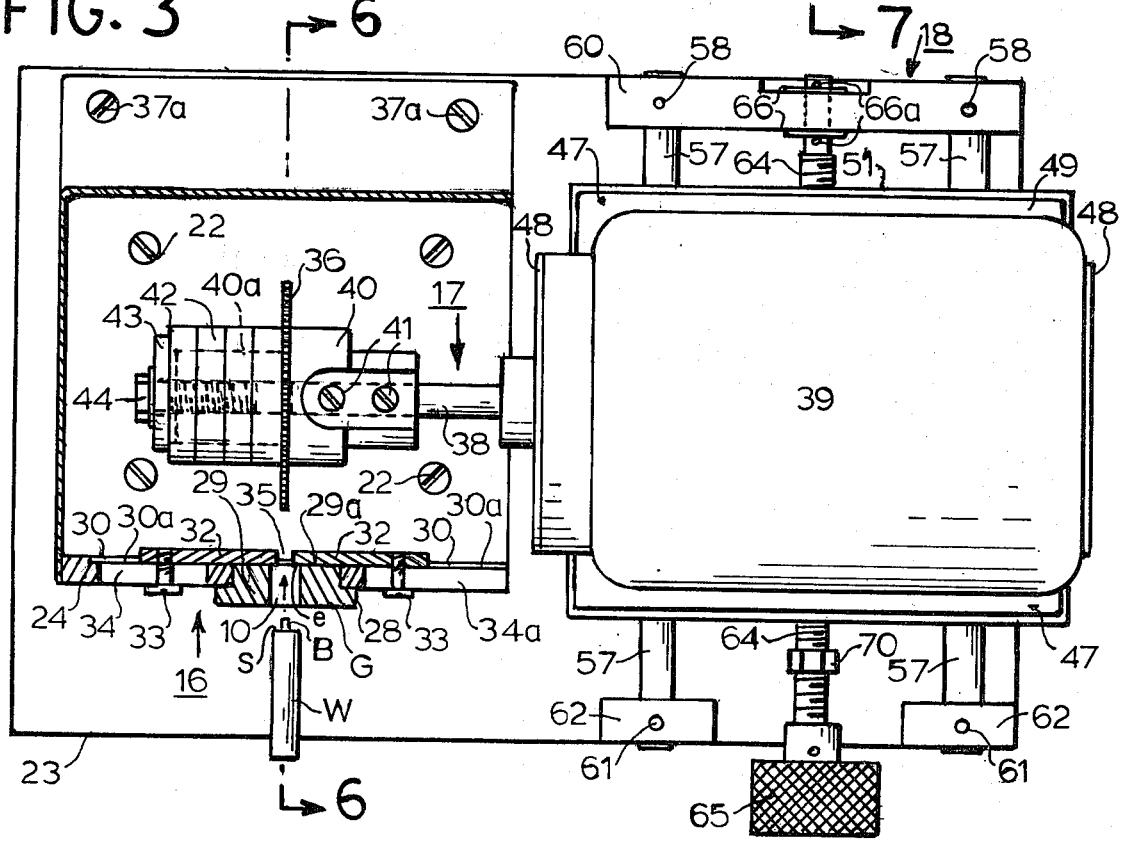

FIG. 3 is a sectional plan view taken along line 3—3 in FIG. 1, showing for purposes of illustration the disintegrating component 17 in retracted non-operating position relative to the workpiece guide component 16;

FIG. 4 is a sectional plan view taken along line 4—4 in FIG. 1, also showing components 16 and 17 in non-operating positions;

FIG. 5 is an isometric rear view of the disintegrating and the guide components in relative non-operating positions;

FIG. 6 is an enlarged vertical sectional view taken along line 6—6 in FIG. 1, showing components 16 and 17 in relative non-operating positions, said view showing a workpiece having its burred end in position for insertion into the guide bore;

FIG. 7 is a transverse sectional view, showing the motor base mount in adjusted locked position suitable for normal operation of the machine;

FIG. 8 is an enlarged sectional detail view similar to portions of FIG. 6, but showing the disintegrating and guide components 17 and 16 in normal operating position and with a workpiece W fully inserted after the burr has been removed;

FIG. 9 is an enlarged sectional view taken along line 9—9 in FIG. 8, and

FIG. 10 is a transverse sectional view similar to FIG. 6, but showing a slightly modified form of invention in which are disintegrating mechanism 17a consists of a reciprocating saw.

In the preferred embodiment of invention shown in FIGS. 1-9, the machine is adapted for the removal of burrs B projecting from and flush with the surrounding eccentrically disposed flat end surfaces S of the respective elongated workpieces or parts W, which parts are manually insertable in cylindrical guide bore 10 of bushing G, more fully described hereinafter. By making relatively simple modifications, the machine may be used to remove burrs from workpieces of various other cross-sectional shapes. For example, in FIG. 2, a workpiece W1 with a square cross-section is shown for insertion in a cylindrical guide bore 11 of a bushing G1; in FIG. 2A, a workpiece W2 having a rectangular cross-section is shown for insertion in a rectangularly shaped bore 12 of bushing G2; and in FIG. 2B, a workpiece W3 having a triangular cross-section is shown for insertion in a cylindrical bore 14 of bushing G3.

Broadly stated, the invention comprises a workpiece guide and stop assembly 16, a burr disintegrating assembly 17, and an adjustment mechanism 18 for adjusting the position of component 17 relative to assembly 16.

For purposes of illustration, FIGS. 3-6 of the drawings show assembly 17 in a retracted, unadjusted, non-operating position relative to assembly 16, whereas, FIGS. 1, 7, 8 and 9 show assemblies 16 and 17 locked in relative operating position by the mechanism 18.

The stop and guide assembly 16 comprises an L-shaped bracket 20 having a horizontally disposed leg 21 secured as at 22 to a base plate 23 FIGS. 5 and 6. Bracket 20 also has a vertically disposed leg or front plate 24 in which the aforementioned workpiece guide bushing G is removably secured by suitable means such as socket screw 25, said bushing having a flange 28 fitting against the front face of plate 24 with its restricted portion 29 extending rearwardly through the plate. The bore 10 extends concentrically through the flange 28 and the restricted portion 29.

As best shown in FIGS. 3, 5, 8 and 9, aligned shallow grooves 30, 30 are provided in the back surface of support 24, said grooves having a bottom surface 30a disposed at right angles to and lying in a vertical plane 29a, which plane coincides with the back end surface of the restricted end portion of the guide G and also with the front vertical surfaces of a pair of positive stop plates 32, 32 mounted in grooves 30, 30. The plates 32 are each adjustable radially of the bore 10 by suitable means such as machine screws 33, 33 in horizontal slots 34, 34a, respectively, provided in the support 24.

It is important to note that the proximate ends of stop plates 32, 32 (FIGS. 5 and 9) each terminates a short distance from the transversely disposed axis of bore 10 thereby providing a space 35 in which the the cutting or disintegrating circumference of a saw 36, or its equivalent, is mounted tangent to said plane 29a at the axis of the bore. Moreover, the vertical front surface of each of the plates 32 lies in the plane 29a and has an eccentric contact area e covering a marginal segment of the back end of said bore 10 as shown in FIG. 9, said area being engagable by the eccentric flat end surface S of part W. It is evident from FIGS. 3 and 9 and the previous description that the eccentric contact stop area e and the cutting circumference of saw 36 each lies in the plane 29a; that plane 29a is parallel to said surrounding eccentric flat end surface S of part W and normal to the axis of bore 10; that the burred end portion of part W is insertable into bore 10 along a path coinciding with the bore axis; and that the eccentric end surface S is insertable into said bore along a path parallel to and is engageable with the eccentric stop area e. Therefore, as the burred end portion of hand-held part W is manually inserted into bore 10, the saw 36 will progressively disintegrate burr B in response to the manual axial pressure exerted upon the part until the flat end surface S engages eccentric contact area e of stop plate 32, at which time, the end surface S will coincide with plane 29a and disintegration by saw 36 will cease simultaneously with the removal of burr B flush with flat end surface S.

From the foregoing description and by observing FIGS. 5 and 6, it is evident that the disintegrating saw 36 must be at least as wide as burr B at said point of tangency in order to disintegrate the entire width of the burr, and must be less than the width of eccentric end surface S in order for the contact area e of plate 32 to lie in the path of insertion of said end surface S.

The eccentricity of stop plate 32 and its associated contact area e may be varied by adjusting the radial position of the plate relative to the axis of bore 10 as previously described.

A cover 37 is provided to shield the operator from saw 36 and other moving parts of the disintegrating assembly 17, said cover being secured to base plate 23 by screws 37a and to leg 24 of bracket 20 by screws 37b (FIGS. 1, 3, 4 and 6). An opening 37c in the top of cover 37 provides access to the set screw 25 therebelow (FIGS. 1 and 6).

Saw 36 is mounted upon the end of shaft 38 of motor 39 by any suitable means such as mount 40 which, in turn, is secured to said shaft by set screws 41, 41 (FIG. 3). Mount 40 has an axially extending hub 40a integral therewith upon which the saw 36 and a plurality of spacer washers 42 are mounted, said parts 36 and 42 being axially confined and fixed to the mount by a bushing 43 and a stud screw 44.

Motor 39 and saw 36 are supported by a U-shaped bracket 47 composed of a pair of spaced angle members 48, 48 attached to a bottom plate 49 (FIGS. 3 and 4). When the stop and guide assembly 16 and the disintegrating assembly 17 are properly positioned for operation, the longitudinal axes of the motor shaft 38 and of the guide bore 10 of bushing G lie in a common horizontal plane, and at this time, the saw 36 is positioned in a vertical plane and with its cutting circumference disposed in space 35 between stops 33, 33 (FIGS. 8 and 9).

In order to adjust the position of assembly 17, including saw 36, longitudinally of the axis of motor shaft 38 and transversely of the axis of guide bore 10, the mechanism broadly designated by numeral 18 is provided. Mechanism 18 includes a bracket plate 51 upon which the bottom plate 49 of U-shaped bracket 47 rests (FIGS. 3–7). The bottom plate has a plurality of elongated slots 52 therein which are parallel to the axis of motor shaft 39, said slots each being penetrated by a stud screw 53 threadably secured in motor bracket plate 51 therebelow. Thus the assembly 17 along with its saw 36 may be adjusted to various positions transversely of guide bore 10 and the space 35.

Mechanism 18 is also provided with means for micrometrically adjusting the disintegrating component and its saw 36 forwardly and backwardly (i.e. longitudinally of the axis of bore 10) to thereby secure it precisely in its normal operating position shown in FIGS. 8 and 9. Accordingly, motor bracket plate 51 is provided with flanges 54 and 55 extending downwardly from its back and front marginal edge portions respectively, said flanges being slidably penetrated by a pair of spaced parallel short shafts 57, 57. The back end of each shaft 57 is fixedly secured as at 58 in a back flange 60 extending upwardly from the back marginal edge portion of base plate 23, and the front end of each shaft 57 is secured as at 61 in one of the spaced upstanding flanges 62, 62 integral with the front marginal edge portion of the plate 23.

The motor bracket plate 51 and the disintegrating assemblies 17 supported thereon may be micrometrically adjusted to various positions longitudinally of shafts 57, 57 by means of a threaded rod or lead screw 64, which screw has a knurled operating nut 65 fixedly secured upon its front end. The back end of screw 64 is rotatably mounted in back flange 60 and secured against axial movement by washers 66 and pins 66a. An intermediate portion of screw 64 threadably engages front flange 55 as at 68 while another intermediate portion is freely rotatable in back flange 54 as at 69 (FIGS. 3 and 7). In order to lock the disintegrating component 17 in either its retracted non-operating position as shown in FIGS. 3–6 or in its normal operating position as shown in FIGS. 1, 7, 8 and 9, a nut 70 on screw or shaft 64 is provided. The nut 70 is screwed into engagement with front flange 55 to lock assemblies 17 in any selected position on shafts 57, 57.

FIG. 10 is a modified form of the invention in which a reciprocatory or jig saw blade 36a is utilized to disintegrate the burr B squarely off and flush with the flat end of Workpiece W, rather than using the circular saw 36 decribed in the previously described embodiment. To adapt the structure of FIGS. 1–9 to accommodate the blade saw, slight changes are made in the parts having the same reference numerals as in FIGS. 1–9 but with the suffix "a" added as shown in FIG. 10. The blade saw 36a is mounted upon shaft 38a and is reciprocated by motor 39a in a wellknown manner. Motor 39a is supported upon bracket 48a as at 53a for backward and forward adjustment. When motor 39a is locked in normal operating position, with saw 36a disposed in space 35 between the ends of stops 32, 32 as shown in dotted lines, the burred end B of workpiece W may be manually inserted in bore 10 and disintegrated flush with the flat end of the workpiece as previously described.

I claim:

1. Apparatus for removing an axially projecting burr (B) from and flush with a surrounding eccentrically disposed flat end surface (S) of an elongated hand-held shop or screw machine part (W) comprising
   (a) guide means including a bore (10) into which the burred end portion of said part (W) is axially and reciprocally insertable;
   (b) disintegrating means (36) aligned with said burred end portion along a path coinciding with the axis of said bore, said disintegrating means being responsive to the axial insertion of said end portion for progressively removing said burr (B) and
   (c) at least one positive stop (32) aligned with and engagable by said eccentric end surface (S) along a second path parallel to said first path of insertion and
   (d) means operable upon engagement of said stop by said end surface (S) for arresting the insertion of said burred end portion and the disintegration of said burr simultaneously with the removal of the latter flush the end surface;
   (e) said disintegrating means consisting of a saw (36), said stop (32) and the cutting edge of said saw at the axis of said bore lying in a common plane (29a) parallel to said end surface (S) and normal to the axis of the bore.

2. The apparatus defined in claim 1 wherein said disintegrating means comprises a circular saw (36) tangent to said common plane (29a) at said bore axis, said saw being at least as wide as said burr (B) and less than the width of said eccentric end surface (S) at said point of tangency.

3. The apparatus defined in claim 1 wherein said disintegrating means comprises a reciprocatory saw (36a) having a width at least as wide as said burr (B) and less than the width of said eccentric end surface (S) at said bore axis.

4. The apparatus defined in claim 1 and further comprising means (33, 34) for adjustably mounted said stop (32) radially of the axis of said bore (10) whereby the eccentricity of the stop is varied.

5. The apparatus defined in claim 2 and further comprising means (33, 34) for adjustably mounting said stop (32) radially of the axis of said bore (10) whereby the eccentricity of the stop is varied.

* * * * *